United States Patent
Varghese (10) Patent No.: US 7,725,766 B2
(45) Date of Patent: *May 25, 2010

(54) SYSTEM FOR SYNCHRONIZING REPLICAS OF A DATABASE

(75) Inventor: John Varghese, San Mateo, CA (US)

(73) Assignee: International Business Machines Corporation, Armonk, NY (US)

( * ) Notice: Subject to any disclaimer, the term of this patent is extended or adjusted under 35 U.S.C. 154(b) by 19 days.

This patent is subject to a terminal disclaimer.

(21) Appl. No.: 12/138,003

(22) Filed: Jun. 12, 2008

(65) Prior Publication Data

US 2008/0244334 A1    Oct. 2, 2008

Related U.S. Application Data

(63) Continuation of application No. 11/078,890, filed on Mar. 10, 2005, now Pat. No. 7,475,281.

(51) Int. Cl.
   *G06F 11/00* (2006.01)

(52) U.S. Cl. .............................. 714/6; 714/4; 713/168; 709/223; 709/224

(58) Field of Classification Search .................. 714/6
   See application file for complete search history.

(56) References Cited

U.S. PATENT DOCUMENTS

| | | | |
|---|---|---|---|
| 5,781,908 | A | 7/1998 | Williams et al. |
| 5,781,910 | A | 7/1998 | Gostanian et al. |
| 6,061,799 | A | 5/2000 | Eldridge et al. |
| 6,259,956 | B1 | 7/2001 | Myers et al. |
| 6,317,786 | B1 | 11/2001 | Yamane et al. |
| 6,748,555 | B1 | 6/2004 | Teegan et al. |
| 6,785,713 | B1 | 8/2004 | Freeman et al. |
| 6,944,634 | B2 | 9/2005 | Kim et al. |
| 7,475,281 | B2 * | 1/2009 | Varghese ................ 714/6 |
| 2003/0014433 | A1 | 1/2003 | Teloh et al. |
| 2003/0101359 | A1 | 5/2003 | Aschen et al. |
| 2003/0158953 | A1 | 8/2003 | Lal |
| 2004/0260873 | A1 | 12/2004 | Watanabe |

* cited by examiner

*Primary Examiner*—Emerson C Puente
(74) *Attorney, Agent, or Firm*—Samuel K. Simpson; Patent Ingenuity, P.C.

(57) ABSTRACT

A system for synchronizing replicas of a database. The system detects a failure of update data from a first replica to be applied to a second replica and determines a cause of the failure. The system also resolves the cause of the failure. According to the system disclosed herein, the present invention synchronizes the replicas of the database without requiring manual intervention.

4 Claims, 5 Drawing Sheets

SYSTEM FOR SYNCHRONIZING REPLICAS OF A DATABASE

CROSS-REFERENCE TO RELATED APPLICATIONS

Under 35 USC §120, this application is a continuation application and claims the benefit of priority to U.S. patent application Ser. No. 11/078,890, filed Mar. 10, 2005, entitled "Method for Synchronizing Replicas of a Database," which is incorporated herein by reference.

FIELD OF THE INVENTION

The present invention relates to databases, and more particularly to a method and system for synchronizing replicas of a database.

BACKGROUND OF THE INVENTION

Databases are well known and are used in a variety of applications. For example, a bug tracking database may be used to collect bug and failure data for software or firmware in computers and computer networks. Databases are typically used by different user groups, such as development and quality assurance (QA) teams, which use databases to manage defects, enhancements, and requests for service.

A problem with databases is that users are typically distributed worldwide. There could be hundreds or thousands of users from several different continents accessing a database. Consequently, access to the database from distant geographical locations can be inconveniently slow.

A conventional solution is to create replicas (exact reproductions of a database) at different server sites in order to enable local access to users everywhere in the world. Any transactions (updates to the database) at each server site are replicated at other replicas so that all of the replicas are continually updated. A replication (synchronization) program, which updates all of the replicas, typically involves an export function and import function. Typically, a synchronization packet (hereinafter referred to as a "packet") that contains metadata for a transaction of a replica is exported from one server site and then imported at destination replicas (the replicas to be updated) located on other respective server sites.

A problem with this conventional solution is that packets often do not get imported at a particular destination replica. The most common reason for such a failure is that one or more packets preceding the current packet has been lost in transit or lost in some other manner. Typically, packets should be received in a particular sequence or they will not be applied. When a packet is lost, the import function of the synchronization process for that destination server site stops and subsequent packets start accumulating in the in-box.

When packets accumulate in the in-box, neither the administrator at the sending server site nor the administrator at the destination server site is notified. The administrator at the sending server site will not notice the accumulated packets since they are at the destination server site. The administrator at the destination server site may notice the accumulated packets only if that administrator manually and routinely checks the server site for accumulated packets. However, that administrator would not be able to take any corrective actions, because a corrective action for this particular problem would involve actions taken at the sending server site. The administrator at the destination server site typically does not have privileges to access the sending server site and thus would not be able to resolve the problem. Accordingly, that administrator has to somehow request help from the administrator at the sending server. This can take some time especially if the administrators are in distant time zones. The administrator at the destination server site may have to resort to email communication, which could span hours. Consequently, the turnaround time for resolution of the problem is adversely affected.

Another problem with the conventional solution is that, after any problems are resolved at the sending server site, a new synchronization cycle has to be manually forced to enable the replication/synchronization process. To accomplish this, the administrator at the sending server site requires information that is available only at the destination server site. A problem is that the administrator at the sending server site typically does not have privileges to access the sending server site and would thus not be able to retrieve the required information. Accordingly, the administrator at the sending server site would need to contact the administrator at the destination server site to get the information. As indicated above, this can take some time due to the administrators being in distant time zones or communicating by email, which could span hours. Consequently, the turnaround time to resolve such a problem is adversely affected.

Another reason that packets accumulate is that at the destination server site, the database user account of the database server has been locked out (at the OS level). A lockout may occur, for example, if the password is periodically changed (e.g. every 90 days) or after a predetermined number of logins (e.g. after 300 logins) and a user attempts to login with an old password. An administrator would then have to unlock the password. Consequently, incoming packets would not get imported at the replica at the destination server site. The administrator at the destination server site would learn of the problem only by manually and routinely checking if incoming packets have accumulated. Then, by manually running import commands, the administrator can determine if the user account is locked out. The administrator would then have to manually unlock the database user account and then manually rerun the import function of the replication program.

A synchronization failure can also originate at the sending server site. For example, a glitch during a previous export may prevent all further exports from occurring. The administrator at the sending server site will learn of such a failure only if that administrator manually and routinely checks the status of the last scheduled export and then manually runs the export function to determine the cause of the failure. The administrator would have to manually resolve the cause of the failure and then manually force the synchronization (i.e. export function).

Accordingly, what is needed is an improved method and system for reliably synchronizing replicas of a database. The method and system should be capable of being easily adapted to existing technology. The present invention addresses such a need.

SUMMARY OF THE INVENTION

A method and system for synchronizing replicas of a database is disclosed. The method includes detecting a failure of update data from a first replica to be applied to a second replica; determining a cause of the failure; and resolving the cause of the failure. According to the method and system disclosed herein, the present invention synchronizes the replicas of the database without requiring manual intervention.

DETAILED DESCRIPTION OF THE INVENTION

The present invention relates to databases, and more particularly to a method and system for synchronizing replicas of a database. The following description is presented to enable one of ordinary skill in the art to make and use the invention, and is provided in the context of a patent application and its requirements. Various modifications to the preferred embodiment and the generic principles and features described herein will be readily apparent to those skilled in the art. Thus, the present invention is not intended to be limited to the embodiment shown, but is to be accorded the widest scope consistent with the principles and features described herein.

A method and system in accordance with the present invention for synchronizing replicas of a database system is disclosed. The method includes a synchronization process for updating replicas of a database where a packet containing update data from a first replica is sent from the first replica to a second replica. If the packet fails to be applied to the second replica, the synchronization process self-corrects by detecting a failure of the update data from the first replica to be applied to the second replica, determining a cause of the failure, and then resolving the cause of the failure. The synchronization process then resends the update data, and applies the update data to the second replica. As a result, the replicas of the database system are synchronized without requiring manual intervention. To more particularly describe the features of the present invention, refer now to the following description in conjunction with the accompanying figures.

Although the present invention disclosed herein is described in the context of a bug tracking database having replicas, the present invention may apply to other types of databases, and still remain within the spirit and scope of the present invention.

Figure 1:
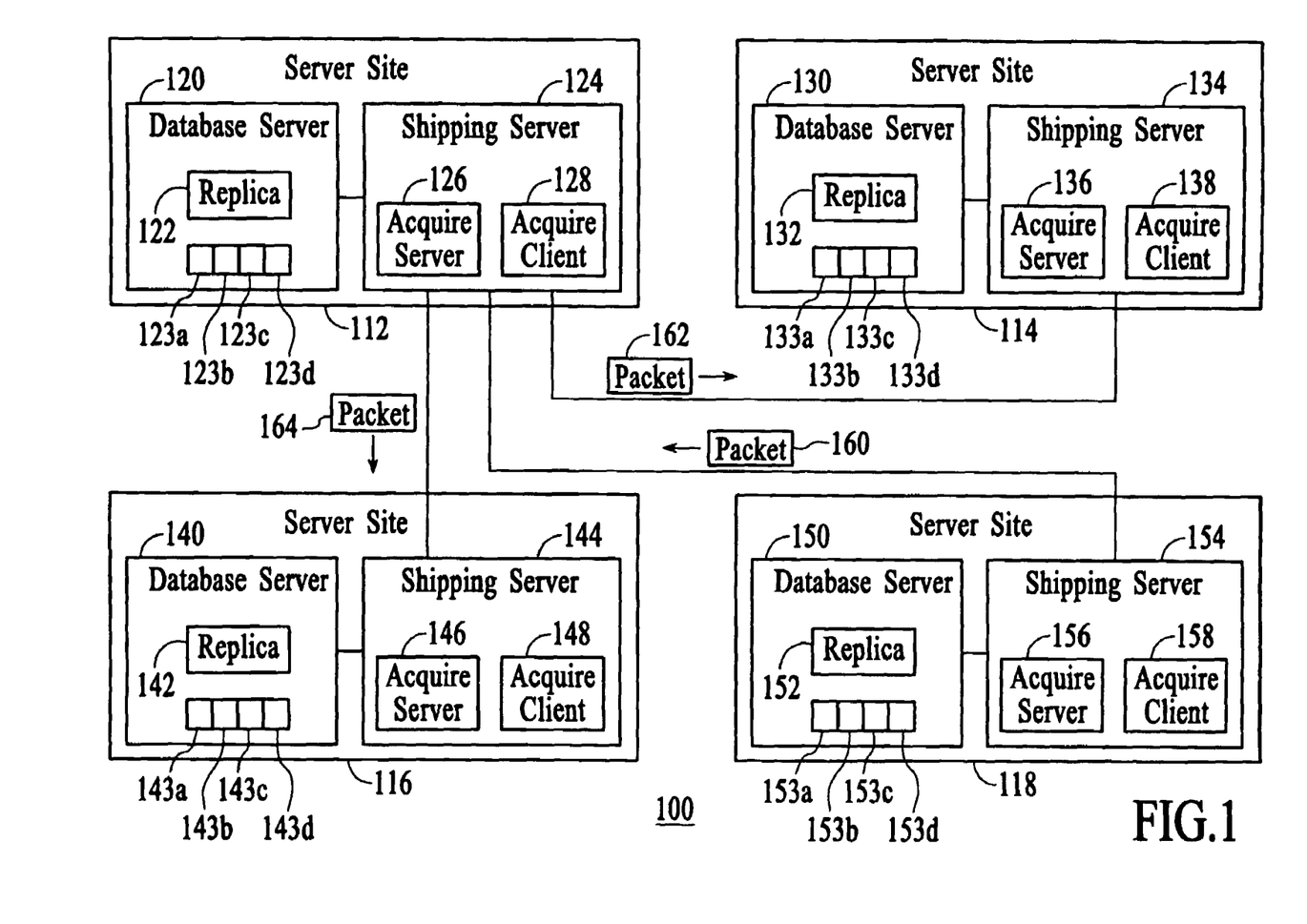
FIG. 1 is a block diagram of a database system in accordance with the present invention.

FIG. 1 is a block diagram of a database system 100 in accordance with the present invention. The server system 100 includes server sites 112, 114, 116, and 118. The server site 112 has database server 120, which has a replica 122 and operations logs 123a, 123b, 123c, and 123d, and has a shipping server 124, which has an acquire server 126 and an acquire client 128. Similarly, the server sites 114, 116, and 118 have respective database servers 130, 140, and 150, which have respective replicas 132, 142, and 152 and operations logs 133a-d, 143a-d, and 153a-d, and have respective shipping servers 134, 144, and 154, which have respective acquire servers 136, 146, and 156 and acquire clients 138, 148, and 158. In an alternative embodiment, the database servers 120-150 and the shipping servers 124-154 at each server site 112-118, respectively, can be implemented with one database/shipping server per server site 112-118. Also, the acquire servers 126-156 and the acquire clients 128-158 can alternatively reside on physical servers apart from the shipping servers. In other words, they do not have to be co-located with the shipping servers.

Although the present invention is described in the context of four server sites 112-118, where one of the server sites 112 is a hub server site, one of ordinary skill in the art will readily recognize that there could be any number of server sites and hub server sites, and their use would be within the spirit and scope of the present invention.

The acquire servers 126-156 run as services and the acquire clients 128-158 run as scheduled tasks, preferably on a Windows operating system, and are configured to run on a Windows server, preferably on their respective local shipping servers (i.e. the shipping sever residing within the same server site). Each of the acquire clients 128-158 runs at predefined intervals (e.g. every 20 minutes) and is completely configurable. They provide services for their respective local replicas 122-152 (i.e. the replica residing within the same server site). Each of the acquire servers 126-156 runs in the background and is completely configurable. They provide services for remote replicas 122-152 (i.e. the replicas residing at other server sites). When a new replica is added to the database system 100, a new acquire server and acquire client is installed at the server site of the new replica.

In the following scenario, it is assumed that a transaction has occurred in the replica 152 of the server site 118. In operation generally, when the replica 152 is updated, the transaction (update) data is recorded in an operations log 153d associated with the replica 152. A transaction can be, for example, a bug description or a note that a bug has been fixed. The transaction data is then sent to the database server 120, which functions as a hub database server. The transaction data is sent in a packet 160. The database server 120 imports the packet 160, updates its local replica 122 with the transaction data, records the transaction data in an operations log 123d, and then sends packets 162 and 164 containing the transaction data to the shipping server 134 and 144 since their respective replicas 132 and 142 have not been updated with the transaction data. The shipping server 124 queries the database server 120 as to which transaction data needs to be sent (e.g. the transaction data from the replica 152) and to where (e.g. the replicas 132 and 142). This synchronization process takes a certain amount of time (e.g. 20 minutes) and is scheduled to occur at predefined intervals (e.g. every 20 minutes) and is completely configurable. The database servers 120-150 are all piers. Accordingly, they alternatively can be directly connected to each other and can send transactions directly to each other.

Generally, the acquire clients 128-158 function to ensure that packets have been sent from their respective replicas 122-152 to the appropriate replicas 122-152 to be updated, and that the packets once received have been applied. The acquire clients 128-158 are fully configurable and are configured to run as a scheduled task that occurs at predefined intervals (e.g. every 20 minutes). The acquire clients 128-158 function in conjunction with the acquire servers 126-156, which are fully configurable, to verify that the packets have been applied to the appropriate replicas 122-152.

Figure 2:
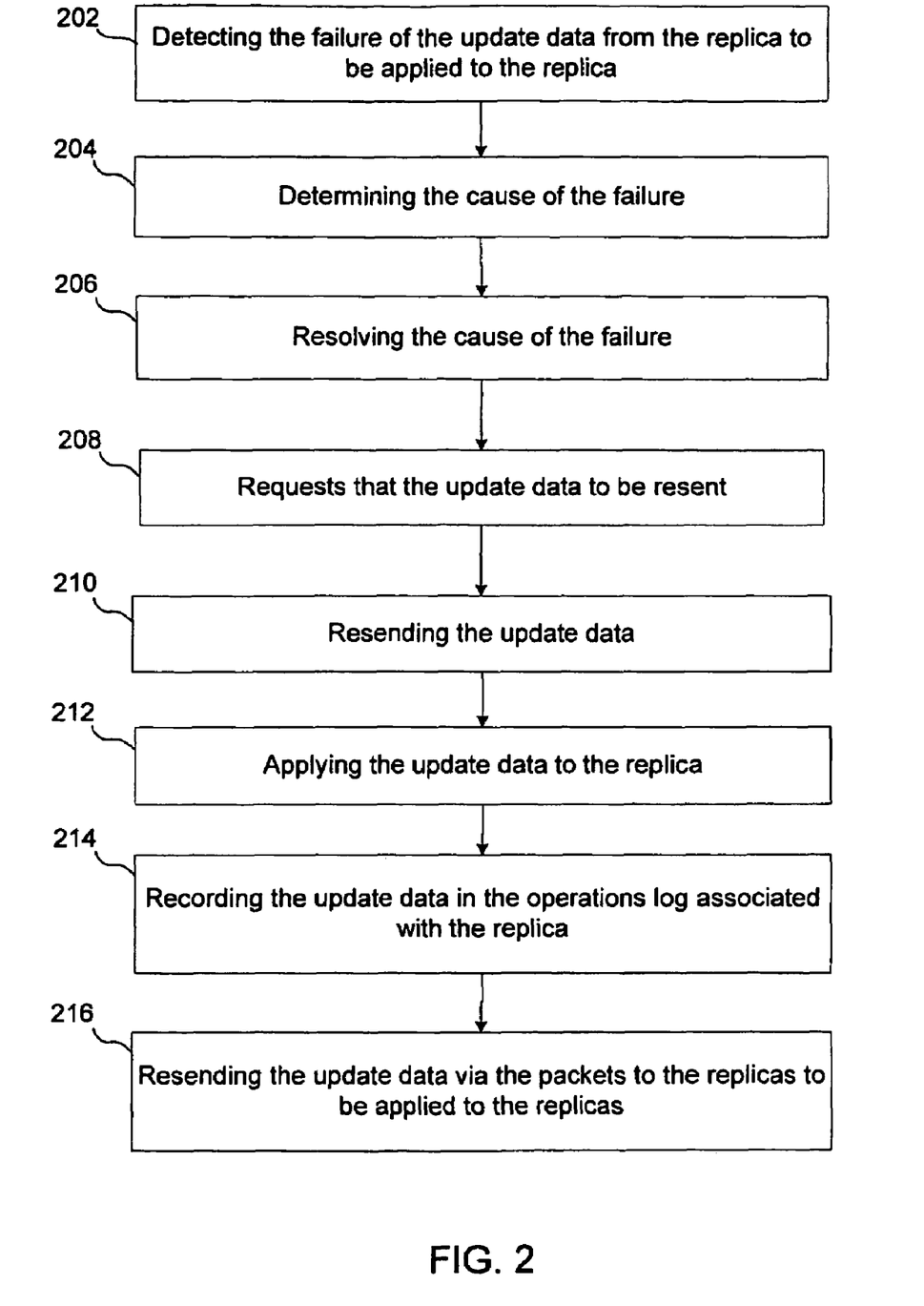
FIG. 2 is a flow chart showing a method for synchronizing the replicas of the database system of FIG. 1 in accordance with the present invention.

FIG. 2 is a flow chart showing a method for synchronizing the replicas 122-152 of the database system 100 of FIG. 1 in accordance with the present invention. In the following embodiment, referring to both FIGS. 1 and 2, it is assumed that the update data from the replica 152 has been successfully applied to the replica 122. It is further assumed that the update data is to be sent from the replica 122 to the replicas 132 and 142, but the update data contained in the packet 162 has failed to be applied to the replica 132.

In accordance with the present invention, the synchronization process self-corrects if the update data fails to be applied to the appropriate replica 132. The process begins in a step 202 where the acquire client 138 detects the failure of the update data from the replica 152 to be applied to the replica 132. Next, in a step 204, the acquire client 138 automatically determines the cause of the failure. For example, the acquire client 138 determines where the cause of the failure occurred and if the failure was due to the packet 162 being lost. Next, in a step 206, the acquire client 138 resolves the cause of the failure. For example, if the cause of the failure is due to the packet 162 being lost, the acquire client 138 automatically requests for a packet to be resent. When the packet arrives, it is processed normally thereby avoiding the delay in synchronization. Or, if the cause of the failure is due to the user account of the database 120 being locked out (at the OS level), the acquire client 138 automatically unlocks the user account. The acquire client 138 automatically unlocks the user account based on a configuration set by the local administrator (i.e. the administrator at the server site 114). Alternatively, the acquire client 138 automatically informs the local administrator of the failure, preferably via email. Or, if the cause of the failure is due to an object such as a temporary folder or directory not being deleted, the acquire client 128 automatically deletes that object and continues with the synchronization process. Such an object is typically created when the update data is placed into a packet, and that object typically should be deleted before the packet can be sent out. In all these scenarios, the acquire client 138 can optionally automatically notify an appropriate authority of the failure. Such notification may be sent merely to inform the appropriate authority of the failure and that corrective action has been automatically taken. Such notification may also be sent if any corrective action needs to be taken by the appropriate authority.

Next, in a step 208, the acquire client 138 requests that the update data to be resent. Next, in a step 210, the acquire client 128 resends the update data. Next, in a step 212, the database server 130 applies the update data to the replica 132. Next, in a step 214, the database server 130 records the update data in the operations log 133d associated with the replica 152. Next, in a step 216, the acquire client 128 resends the update data via the packets 162 and 164 to the replicas 132 and 142 to be applied to the replicas 132 and 142. Metadata required for resending is automatically updated and is automatically shared between the sending and destination server sites. Accordingly, the replicas 122-152 of the database system 100 are synchronized without requiring manual intervention.

Figure 3:
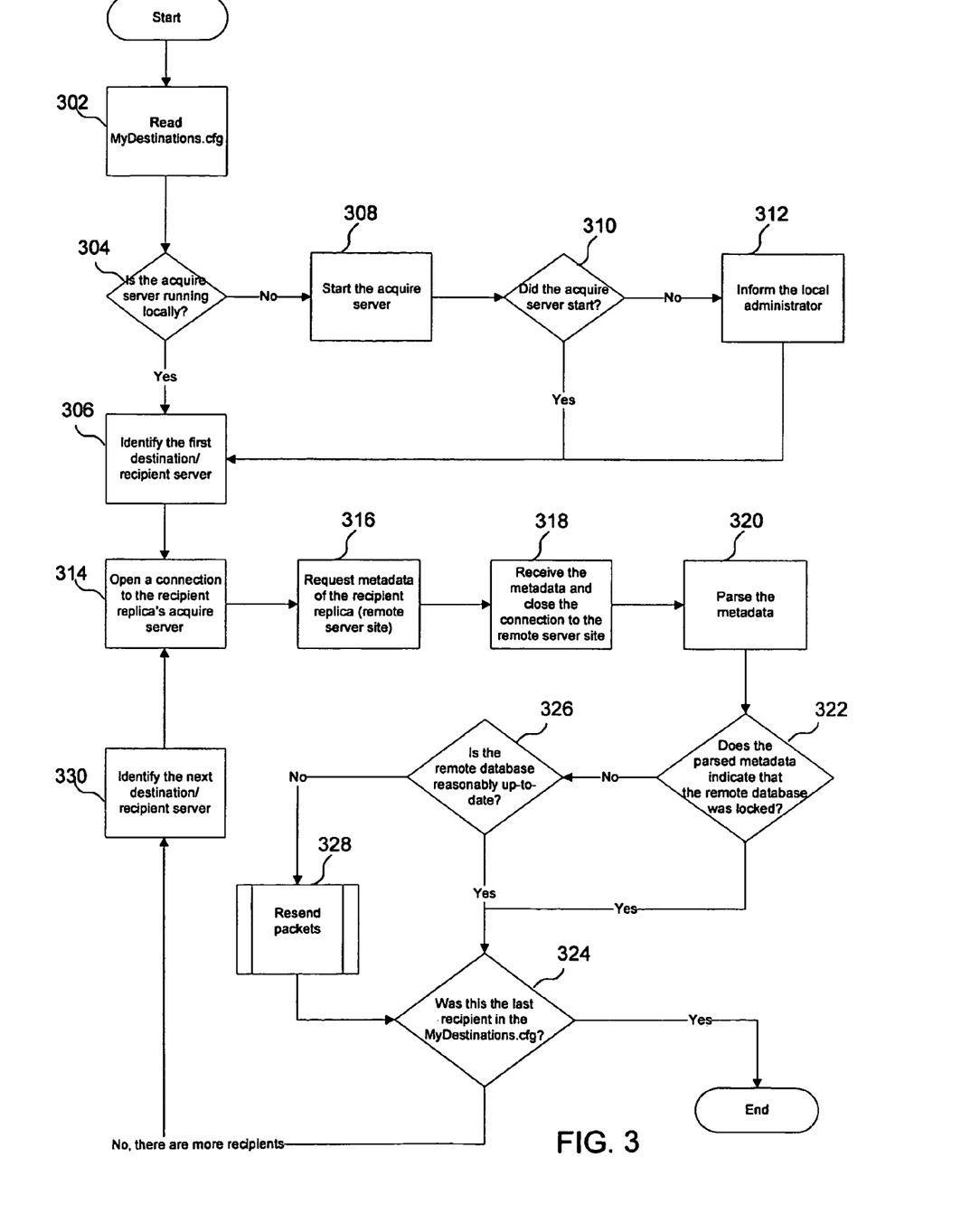
FIG. 3 is a flow chart showing a method for synchronizing the replicas of the database system of FIG. 1 from the perspective of an acquire client, in accordance with the present invention.
Figure 4:
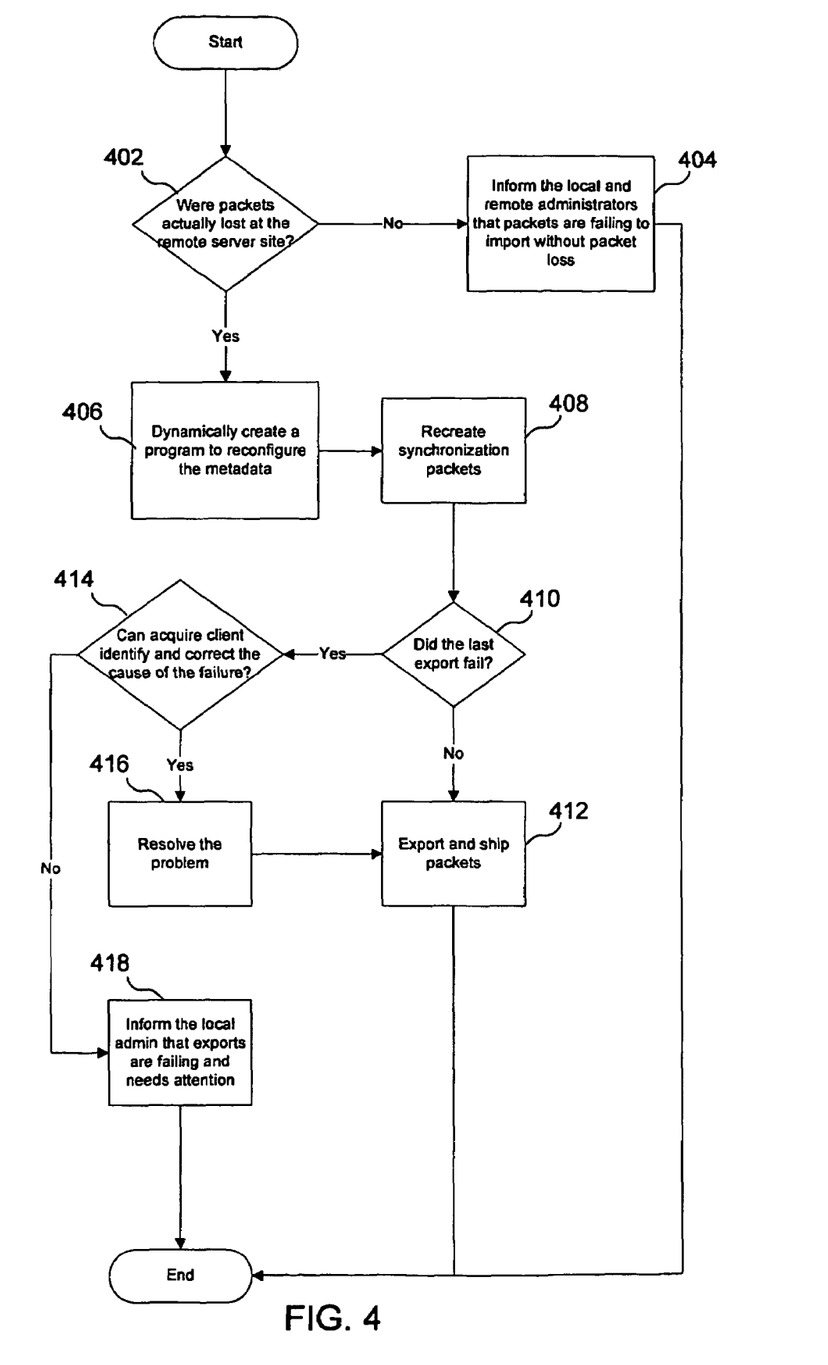
FIG. 4 is a flow chart showing a method for resending a packet during synchronization of the replicas of the database system of FIG. 1, in accordance with the present invention.
Figure 5:
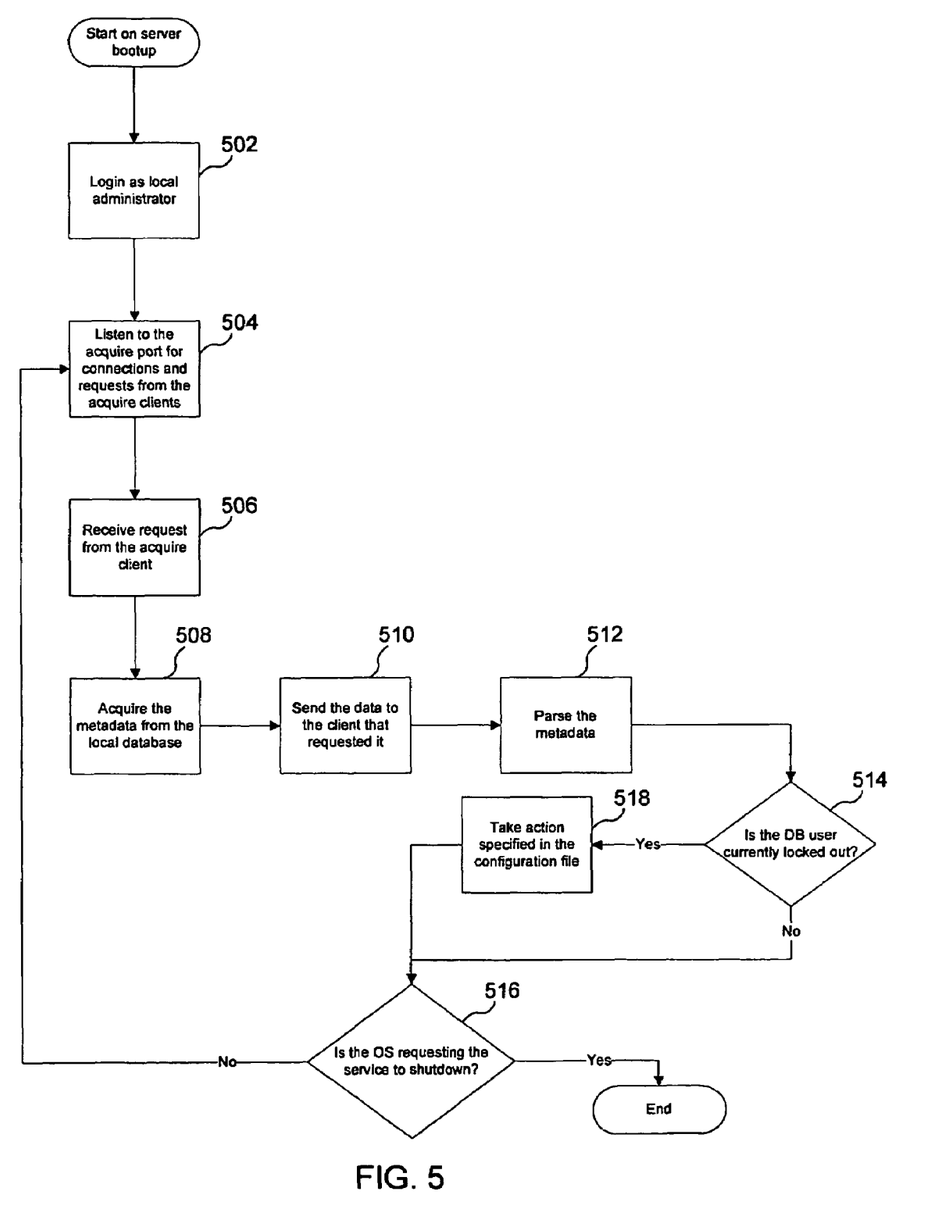
FIG. 5 is a flow chart showing a method for synchronizing the replicas of the database system of FIG. 1 from the perspective of an acquire server, in accordance with the present invention.

FIG. 3 to FIG. 5 provide further detail of the acquire client and the acquire server of each server site. The scenario of FIG. 2 is also assumed in FIGS. 3 to FIG. 5.

FIG. 3 is a flow chart showing a method for synchronizing the replicas 122-152 of the database system 100 of FIG. 1 from the perspective of the acquire client 128 at the server site 112, in accordance with the present invention. Referring to both FIGS. 1 and 3 together, the process begins in a step 302 where the acquire client 128 reads a configurations file (My-Destinations.cfg) to get configuration information for each of the destination server sites 114 and 116. The configurations file contains information such as replica names, related acquire server host names, and temporary folder names created by the export function of the synchronization program. The configurations file is configured separately for each site when the acquire client and servers are installed. The configuration information is available for each of the recipient server sites.

Next, in a step 304, the acquire client 128 determines if the acquire server 126 is running. Normally, the acquire server 126 starts up when the shipping server 124 boots up. If yes, in a step 306, the acquire client 128 identifies the first destination server site 114. If not, in a step 308, the acquire server 126 is started. Next, in a step 310, the acquire client 128 determines if the acquire server 126 has started. If yes, the acquire client 128 identifies the first destination server site 114, in the step 306. If not, in a step 312, the acquire client 128 notifies the local administrator that the acquire server 126 has not started, and then identifies the first destination server site 114, in the step 306.

Next, in a step 314, the acquire client 128 connects with the destination acquire server 136. Next, in a step 316, the acquire client 128 requests metadata (e.g. current status and statistics) from the replica 132 at the destination server site 114. Next, in a step 318, the acquire client 128 receives the metadata from the acquire server 136. This metadata contains export parameters, which are automatically modified at the sending server site. The acquire server 136 runs a fetching program (GetCurrentStatus) that collects metadata information about the replica 132 and returns the metadata to the acquire client 128. The acquire client 128 then disconnects from the acquire server 136, in the step 318.

Next, in a step 320, the acquire client 128 parses the metadata received from the acquire server 136. Next, in a step 322, the acquire client 128 determines if the parsed metadata indicates that the database server 130 was locked out. If yes, in a step 324, the acquire client 128 determines if the replica 132 is the last recipient replica to receive an update. If yes, the process ends. If in the step 322, the acquire client 128 determines that the parsed metadata does not indicate that the database server 130 was locked out, in a step 326, the acquire client 128 determines if the replica 132 is reasonably up-to-date. Reasonably up-to-date means that it has been updated with the current update data (from the packet 160). If not, in a step 328, the acquire client 128 resends a packet containing the update data. If in the step 324, the acquire client 128 determines that the replica 132 is not the last replica to receive the update data, in a step 330, the acquire client 128 identifies the next intended destination replica (e.g. 142) and the process the goes back to the step 314.

FIG. 4 is a flow chart showing a method for resending a packet during synchronization of the replicas 122-152 of the database system 100 of FIG. 1, in accordance with the present invention. Referring to both FIGS. 1 and 4 together, the process begins in a step 402 where the acquire client 128 requests the result of the last failed import from the acquire server 136 to confirm that a packet was actually lost at the destination server site 114. If not, in a step 404, the acquire client 128 informs the administrators at the sending and receiving sites that packets are failing to import without packet loss. The process then ends. If yes, in a step 406, the acquire client 128 dynamically creates and invokes a resend program (ResendPackets) to reconfigure the CQ metadata. The resend program is based on the status of the replica 132, so that the acquire client 128 can send the correct packets to the replica 132.

Next, in a step 408, the acquire client 128 creates a new packet. Next, in a step 410, the acquire client 128 determines if the last export to the replica 132 failed. This determination is accomplished by checking the operations logs. If the last export did not fail, in a step 412, the acquire client 128 exports a packet, and the process ends. If the last export did fail, in a step 414, it is determined if the acquire client 128 can identify and resolve the cause of the failure. If yes, in a step 416, the acquire client 128 resolves the cause of the failure. For example, if the export failed because an object such as a temporary folder or directory was not deleted by a previous export, the acquire client 128 empties and deletes that object. Next, in a step 412, the acquire client 128 exports the packets. In the step 414, if the acquire client 128 cannot identify and correct the cause of the failure, in a step 418, the acquire client 128 notifies the local administrator that exports are failing and needs attention.

FIG. 5 is a flow chart showing a method for synchronizing the replicas 122-152 of the database system 100 of FIG. 1 from the perspective of the acquire server 136 at the server site 114 of FIG. 1, in accordance with the present invention. Referring to both FIGS. 1 and 5 together, once the shipping server 134 boots up, the process begins in a step 502 where the acquire server 136 logs in as a local administrator. Next, in a step 504, the acquire server 136 listens at an acquire port for connections and requests for metadata from the acquire client 128 (or other acquire clients when connected to other acquire clients). Such metadata includes export parameters such as current status data and statistics, for example. This metadata is used to enable the synchronization process and export packets.

Next, in a step 506, the acquire server 136 is connected to and receives a request from the acquire client 128. Next, in step a 508, when the acquire client 128 requests metadata from the acquire server 136, the acquire server 136 acquires the metadata by running a fetching program (GetCurrentStatus) with the appropriate parameters. Next, in a step 510, the acquire server 136 sends the metadata to the acquire client 128 and then disconnects from the acquire client 128. Next, in a step 512, the acquire server 136 parses the metadata that it had sent to the acquire client 128.

Next, in a step 514, the acquire server 136 determines if the parsed metadata indicates that the database user account of the database server 130 is locked out at the OS level. If not, in a step 516, the acquire server 136 determines if the operating system is requesting the acquire server 136 service to shut down. If the operating system is requesting the acquire server 136 service to shut down, the acquire server 136 service shuts down and the process ends. Otherwise, the acquire server 136 goes back to listening to the acquire port in the step 504.

The configuration file (What2doInCaseOfLockout.cfg) is used by the local administrator to configure what to do in case of an account lockout. For example, the acquire server 136 can automatically unlock the database user account. If in the step 514, if it is determined that the database user account is locked out, in a step 518, the acquire server 136 takes actions specified in the configuration file. For example, the acquire server 136 may automatically unlock the database user account and then automatically notify the local administrator, preferably by email, that the database user account has been automatically unlocked. Alternatively, the acquire server 136 may notify the local administrator of the failure so that the local administrator can take corrective actions if necessary. If a notification was sent within a predetermined time period (e.g. within the last one hour) for the exact same issue, the acquire server will not send another email. Next, in the step 516, the acquire server 136 determines if the operating system is requesting the acquire server 136 service to shut down. If yes, the acquire server 136 service shuts down and the process ends. If not, the acquire server 136 goes back to listening to the acquire port in the step 504.

According to the method and system disclosed herein, the present invention provides numerous benefits. For example, it eliminates manual checking for accumulating packets. It automatically resolves causes of failures. It automatically notifies appropriate authorities of failures and corrective actions taken.

A method and system for synchronizing replicas of a database has been disclosed. The method includes a synchronization process for updating replicas of a database where a packet containing update data from a first replica is sent from the first replica to a second replica. If the packet fails to be applied to the second replica, the synchronization process self-corrects by detecting a failure of the update data from the first replica to be applied to the second replica, determining a cause of the failure, and then resolving the cause of the failure. The synchronization process then resends the update data, and applies the update data to the second replica. As a result, the replicas of the database system are synchronized without requiring manual intervention.

The present invention has been described in accordance with the embodiments shown. One of ordinary skill in the art will readily recognize that there could be variations to the embodiments, and that any variations would be within the spirit and scope of the present invention. For example, the present invention can be implemented using hardware, software, a computer readable medium containing program instructions, or a combination thereof. Software written according to the present invention is to be either stored in some form of computer-readable medium such as memory or CD-ROM, or is to be transmitted over a network, and is to be executed by a processor. Consequently, a computer-readable medium is intended to include a computer readable signal, which may be, for example, transmitted over a network. Accordingly, many modifications may be made by one of ordinary skill in the art without departing from the spirit and scope of the appended claims.

What is claimed is:

1. A database system comprising:

a first server site comprising a first replica of a database;

a second server site coupled to the first server site, the second server site comprising a second replica of the database; and a client coupled to the first replica wherein the client is operable to:

send update data from a first replica to a second replica, the first replica being associated with a first acquire server unit and a first acquire client unit, the second replica being associated with a second acquire server unit and a second acquire client unit;

automatically detect a failure of the update data from the first replica to be applied to the second replica wherein the detecting comprises:

requesting, by the first acquire client unit from the second acquire server unit, metadata comprising export parameters; and receiving, by the first acquire client unit from the second acquire server unit, the metadata;

automatically determine a cause of the failure and where the cause of failure occurred, wherein the determining comprises:

determining, by the first acquire client unit, if the failure was due to a packet being lost, wherein the packet contains the update data, wherein the first acquire client unit determines if the failure was due to a packet being lost by requesting from the second acquire server unit, the result of the last failed import to confirm that the packet was actually lost;

parsing, by the first acquire client, the metadata received from the second acquire server unit, wherein the parsed metadata indicates if an account is locked out; and determining, by the first acquire client unit, if the second replica is updated with current update data;

automatically resolve the cause of the failure, wherein the resolving comprises:

requesting, by the first acquire client unit, for a packet to be resent if the cause of the failure is due to the packet being lost;

resending, by the first acquire client unit, a packet containing the update data if the second replica is not updated with current update data;

unlocking, by the first acquire client unit, an account if the cause of the failure is due to the account being locked out;

deleting, by the first acquire client unit, an object if the cause of the failure is due to the object not being deleted during a previous export;

notifying, by the first acquire client unit, an appropriate authority of the failure if corrective actions need to be taken by the appropriate authority;

resending the update data;

applying the update data to the second replica; and recording update data in an operations log.

2. The system of claim 1 further comprising a server that fetches the metadata for the client.

3. The system of claim 2 wherein the metadata indicates if the second replica is up-to-date.

4. A computer-readable storage medium containing program instructions for synchronizing replicas of a database, the program instructions which when executed by a computer system cause the computer system to execute a method comprising:

sending update data from a first replica to a second replica, the first replica being associated with a first acquire server unit and a first acquire client unit, the second replica being associated with a second acquire server unit and a second acquire client unit;

automatically detecting a failure of the update data from the first replica to be applied to the second replica wherein the detecting comprises:

requesting, by the first acquire client unit from the second acquire server unit, metadata comprising export parameters; and receiving, by the first acquire client unit from the second acquire server unit, the metadata;

automatically determining a cause of the failure and where the cause of failure occurred, wherein the determining comprises:

determining, by the first acquire client unit, if the failure was due to a packet being lost, wherein the packet contains the update data, wherein the first acquire client unit determines if the failure was due to a packet being lost by requesting from the second acquire server unit, the result of the last failed import to confirm that the packet was actually lost;

parsing, by the first acquire client, the metadata received from the second acquire server unit, wherein the parsed metadata indicates if an account is locked out; and determining, by the first acquire client unit, if the second replica is updated with current update data;

automatically resolve the cause of the failure, wherein the resolving comprises:

requesting, by the first acquire client unit, for a packet to be resent if the cause of the failure is due to the packet being lost;

resending, by the first acquire client unit, a packet containing the update data if the second replica is not updated with current update data;

unlocking, by the first acquire client unit, an account if the cause of the failure is due to the account being locked out;

deleting, by the first acquire client unit, an object if the cause of the failure is due to the object not being deleted during a previous export;

notifying, by the first acquire client unit, an appropriate authority of the failure if corrective actions need to be taken by the appropriate authority;

resending the update data;

applying the update data to the second replica; and recording update data in an operations log.

* * * * *